United States Patent Office
3,454,609
Patented July 8, 1969

3,454,609
POLY-(TIN ALKYLENE CARBOXY) CONTAINING COMPOUNDS AND THE PREPARATION THEREOF
William J. Considine, Somerset, and Gerald H. Reifenberg, Plainfield, N.J., assignors to M & T Chemicals, Inc., New York, N.Y., a corporation of Delaware
No Drawing. Filed Jan. 3, 1966, Ser. No. 517,949
Int. Cl. C07f 7/22; C08g 33/20
U.S. Cl. 260—429.7       8 Claims

ABSTRACT OF THE DISCLOSURE

A method is provided for preparing novel compositions containing a plurality of recurring monomeric units of organotin with each unit containing at least one divalent carboxyalkyl group of the formula $$-(CH_2)_m\overset{O}{\underset{\|}{C}}-O-$$

bonded to the tin atom, and wherein $m$ is at least about 2, by refluxing in boiling water a tetrakis acid of the general formula $$Sn[(CH_2)_m\overset{O}{\underset{\|}{C}}OH]_4$$

in which $m$ is at least about 2. "The said compositions may find applications as biocides and as plastic stabilizers."

---

This invention relates to polyorganotins and more particularly to polyorganotin compositions containing at least one divalent carboxyalkyl group of the general formula $$-(CH_2)_m\overset{O}{\underset{\|}{C}}-O-$$

in each of its monomeric units and to methods for preparing the same.

Although a great many organotin compounds have been prepared, at present very few of these contain functional substituted alkyl groups. This is due mainly to the fact that the synthetic routes available for the formation of tin-carbon bonds in general cannot be used when reactive functional groups are present. In a more recently developed method, one or more carboxy groups may be introduced directly to the tin atom by an addition reaction in which an aromatic tin hydride or an aliphatic tin hydride is reacted with an olefinic compound. This method, however, is not suitable for synthesizing polyorganotin whose coordination bonds are occupied by carboxyalkyl groups.

It is therefore, the principal object of this invention to provide novel polyorganotin compositions containing a carboxyalkyl group in each of its monomeric units. Another object of this invention is to set forth a technique of preparing these novel compositions. Other objects will be apparent to those skilled in the art upon inspection of the following description.

The novel polyorganotin compositions of this invention comprise a plurality of recurring monomeric units of organotin each containing at least one divalent carboxyalkyl group of the formula $$-(CH_2)_m\overset{O}{\underset{\|}{C}}-O-$$

bonded to the tin atom. In the formula, m is an integer at least about 2. Preferably, the carbon atoms of the polymethylene chain are less than 5. These novel compositions are prepared, advantageously, by the method which comprises refluxing in boiling water a tetrakis acid of the general formula $$Sn[(CH_2)_m\overset{O}{\underset{\|}{C}}OH]_4$$

in which $m$ has the same meaning as above depicted. The resultant polymeric composition is then recovered from the reaction mixture.

The tetrakis (ω-carboxypolymethylene) tins that may be employed for preparing the product of this invention may be prepared by reacting initially an excess amount of a hydroxide with a tetrakis (ω-cyanopolymethylene) tin of the formula $$Sn[(CH_2)_mCN]_4$$

and subjecting the product of the initial reaction to acidification with a concentrated hydrochloric acid at a temperature at or below about 10° C. The hydroxides suitable for the reaction are sodium hydroxide, potassium hydroxide, lithium hydroxide, calcium hydroxide, barium hydroxide, and strontium hydroxide.

The tetrakis (ω-cyanopolymethylene) tin used may be prepared by any suitable method. It is advantageous to use an electrolytic method for the synthesis. Tetrakis(2-cyanoethyl) tin, for example, is produced by the electrolysis of an aqueous alkaline solution of acrylonitrile with a tin cathode. The detail of this electrolytic procedure is described by Tomilov and Kaabak (A. P. Tomilov and L. V. Kaabak, Zhur. Prikland. Khim. 32, 2600 (1959)). This method has an advantage in that there is no sacrifice of active metal values (e.g. magnesium) as contrasted to commercial processes for organotins.

The method used for preparing the tetrakis (ω-carboxypolymethylene)tins may be represented by the following equations.

Step I:
$$Sn[(CH_2)_mCN]_4 + 4MOH + 4H_2O \longrightarrow Sn[(CH_2)_m\overset{O}{\underset{\|}{C}}ONa]_4 + 4NH_3\uparrow$$

Step II:
$$Sn[(CH_2)_m\overset{O}{\underset{\|}{C}}ONa]_4 + 4HCl \longrightarrow Sn[(CH_2)_m\overset{O}{\underset{\|}{C}}OH] + 4NaCl$$

The $m$ in the above equations have the same meaning as depicted above, and MOH is the suitable hydroxide.

The first step of the reaction is carried out in an aqueous reaction medium containing a soluble alcohol, preferably an aqueous methanol solution. An excess amount of hydroxide is used in this step to insure the complete saponification.

The reaction may be conducted at or below the reflux temperature until the saponification is completed. The time required is about 2 to 3 hours.

In the second step, the temperature of the reaction is below about 10° C., preferably conducted at or below about 0° C. The amount of hydrochloric acid required for the acidification depends on the amount of sodium hydroxide used in the first step. It should be sufficient to provide a 1:1 molar ratio of MCl to NaOH used in the first step to neutralize any unreacted sodium hydroxide.

The product thus formed is recovered in a conventional manner with due precautions to avoid decomposition of the product by heat. Filtration and washing steps involved in the recovery of the product are conducted at low temperatures, for example, below 10° C. The product may be air dried at room temperature or at a reduced pressure.

Tetrakis(ω-carboxypolymethylene)tins when dissolved in warm water may start converting to the polyorganotin of this invention. The conversion process however is slow until the solution reaches about 60° C. at which temperature about 20% may be converted. By refluxing the water solution of the tetrakis acid, the conversion may carry to completion.

In the preferred embodiment of this invention, the polyorganotin is prepared by refluxing tetrakis(2-carboxyethyl)tin in boiling water. The reaction may be represented by the following equations:

(1)
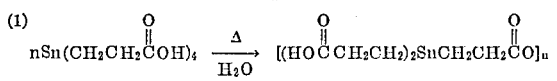

(2)
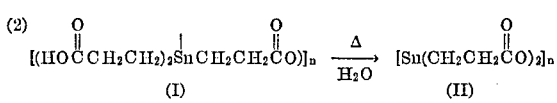

In both compounds I and II, $n$ is an integer at least 2.

Poly-di(2-carboxyethyl)propionatotin (I) is a white crystalline solid, M.P.=180° C. (dec.). It is soluble in hot water but insoluble in cold water and many of the common organic solvents. It does have fair solubility in dimethylformamide. In the conversion process certain amounts of poly-di(2-carboxyethyl)propionatotin (II) is further converted to polydipropionatotin by the loss of $CH_3CH_2COOH$. The conversion from (I) to (II) is about 9% in the normal refluxing temperature. The second product (II) is a white solid with an M.P.=280° C. (dec.). It is insoluble in all common solvents.

The products of this invention may be advantageously prepared directly by the reaction of a tetrakis($\omega$-cyanopolymethylene)tin and a suitable hydroxide without recovery of the intermediate tetrakis acid. If such procedure is used, the reactions may be represented by the following equations:

(3)
$Sn(CH_2CH_2CN)_4 + 4NaOH + 4H_2O \longrightarrow$

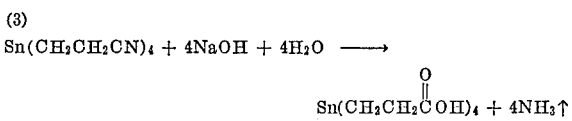

(4)
$2Sn(CH_2CH_2CONa)_4 + 8HCl \longrightarrow$

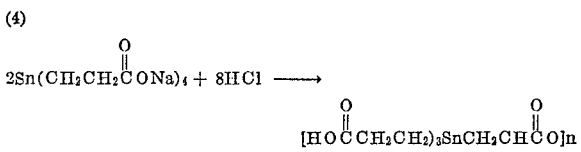

It is understood that the reaction forms the tetrakis(2-carboxyethyl)tin first before its conversion in situ to the polyorganotin product.

Further to illustrate this invention, a specific example is described hereinbelow.

EXAMPLE

Preparation of poly-di(2-carboxyethyl)propionatotin and polydipropionatotin

Reactions in this example follow Equations 1 and 2 stated above.

30 gms. of tetrakis(2-carboxyethyl)tin was refluxed with water (40 ml.) for 2 hours. Material initially went into the solution completely. However, after about 30 minutes of boiling some white solid precipitated (polydipropionatotin). After 2 hours of refluxing, the mixture was filtered hot with suction, about 2 gms. of polydipropionatotin was recovered. The mother liquor was allowed to cool to room temperature and the white solid [poly-di(2-carboxyethyl)propionatotin] crystallized out and was recovered and dried at 50° C. Poly-di(2-carboxyethyl)propionatotin recovered was about 23 gms.

The infrared spectroscopic analysis of polydipropionatotin shows no carboxylic —OH band between 3–4$\mu$ and no —COOH carbonyl band at 5.9$\mu$, but shows a strong ionized carboxyl band at 6.45$\mu$. The IR for poly-di(2-carboxyethyl)propionatotin shows strong carboxylic acid —OH band between 3–4$\mu$, a strong carboxylic acid carbonyl band at 5.9$\mu$ and a strong ionized carboxyl bond at 6.5$\mu$.

Elemental analysis:
  Polydipropionatotin $(C_6H_8O_4Sn)_n$.
    Calculated: Sn, 45.19; C, 27.41; H, 3.05.
    Found: Sn, 44.32; C, 27.07; H, 3.14.
  Poly-di(2-carboxyethyl)propionatotin $(C_9H_{14}O_6Sn)_n$ Calculated: Sn, 35.25; C, 32.08; H, 4.16.
    Found: Sn, 35.40; C, 32.13; H, 4.03.

The lower percent of tin found for polydipropionatotin may be due to the presence of non-tin containing ends. Both compounds appear to have a low degree of polymerization. The exact structure of the polymers are not completely clear, they may be postulated as follows:

Polydipropionatotin (cross-linked)

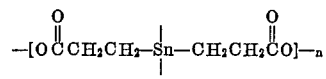

Poly-di(2-carboxyethyl)propionatotin (linear)

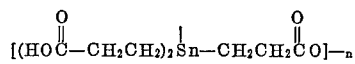

The polyorganotin compositions of this invention may find applications a biocides and as plastic stabilizers.

We claim:
1. A method for preparing a polyorganotin compound containing at least one divalent carboxyalkyl group of the general formula

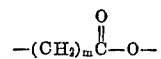

in each of its monomeric units in said carboxyalkyl group $m$ being an integer at least about 2, which comprises refluxing in boiling water a tetrakis acid of the general formula

and recovering said polymeric compound.

2. A method according to claim 1 wherein $m$ is an integer 2–4.

3. A method according to claim 1 wherein tetrakis acid has the formula

4. A method according to claim 3 in which the tetrakis-acid is prepared in situ by reacting tetrakis(2-cyanoethyl)tin with sodium hydroxide at a temperature below about 10° C.

5. A method according to claim 4 in which the temperature is below about 0° C.

6. A polymeric composition of the general formula

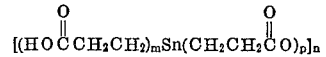

and when $m$ is 2 then $p$ is 1, and when $m$ is 0 then $p$ is 2; which comprises a plurality of recurring monomeric units of organotin each containing at least one divalent carboxyalkyl group of the formula

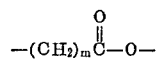

bonded to the tin atom, in said formula $m$ being an integer 2–4.

7. A polyorganotin composition of claim 6 in which has the formula

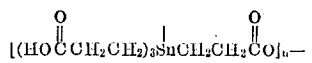

wherein $n$ is a least 2.

8. A polyorganotin composition of claim 6 in which has the formula
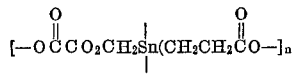
wherein $n$ is at least 2.
References Cited
UNITED STATES PATENTS
3,332,970  7/1967  Smith _____ 260—429.7
3,347,833  10/1967  Smith _____ 260—429.7
TOBIAS E. LEVOW, *Primary Examiner.*
W. F. W. BELLAMY, *Assistant Examiner.*
U.S. Cl. X.R.
260—45.75, 999